United States Patent [19]

Scharla-Nielsen et al.

[11] 4,228,538
[45] Oct. 14, 1980

[54] REAL-TIME ADAPTIVE POWER CONTROL IN SATELLITE COMMUNICATIONS SYSTEMS

[75] Inventors: Hans Scharla-Nielsen, Palm Bay; Frank A. Perkins, Melbourne, both of Fla.

[73] Assignee: Harris Corporation, Cleveland, Ohio

[21] Appl. No.: 860,988

[22] Filed: Dec. 15, 1977

[51] Int. Cl.³ .............................................. H04B 7/20
[52] U.S. Cl. ...................................... 455/9; 455/12; 455/69
[58] Field of Search ................... 325/2, 4, 14, 39, 62, 325/67, 363; 179/15 AF, 15 AD, 15 BL; 343/177; 340/146.1 C

[56] References Cited

U.S. PATENT DOCUMENTS

| | | | |
|---|---|---|---|
| 3,151,295 | 9/1964 | Haviland | 325/4 X |
| 3,995,119 | 11/1976 | Paychinski, Jr. | 179/15 AF |
| 4,038,600 | 7/1977 | Thomas | 325/62 X |
| 4,079,371 | 3/1978 | Shimamura | 179/15 AF |

Primary Examiner—Benedict V. Safourek

[57] ABSTRACT

An adaptive transmitter power control for use in satellite communications systems wherein at least two ground stations communicate serial streams of binary data via a satellite transponder whose power-output is functionally dependent upon received signal strength. At least one of the ground stations includes a quality monitor which makes a real-time determination of the quality of the received signal, and generates signal quality indications in accordance with this determination. These signal quality indications are continuously communicated back to the corresponding transmitting station along with the serial stream of binary data. An encoder multiplexes the normal binary data and the signal quality indications into single, combined signal for transmission over only a single communications channel. The normal binary data and the signal quality indications are reconstructed at the transmitting station, where the signal quality indications are used to control the power level of the transmitted signal.

5 Claims, 8 Drawing Figures

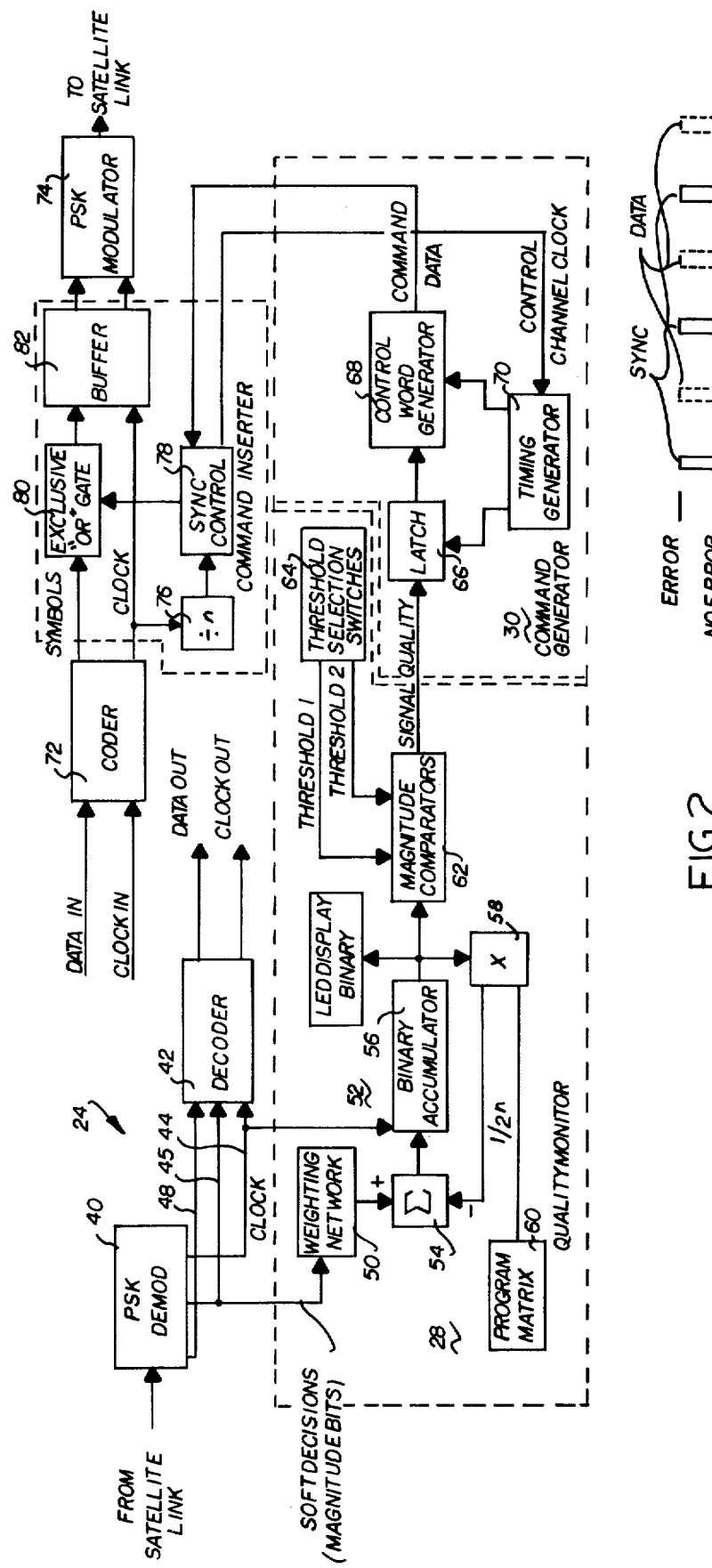

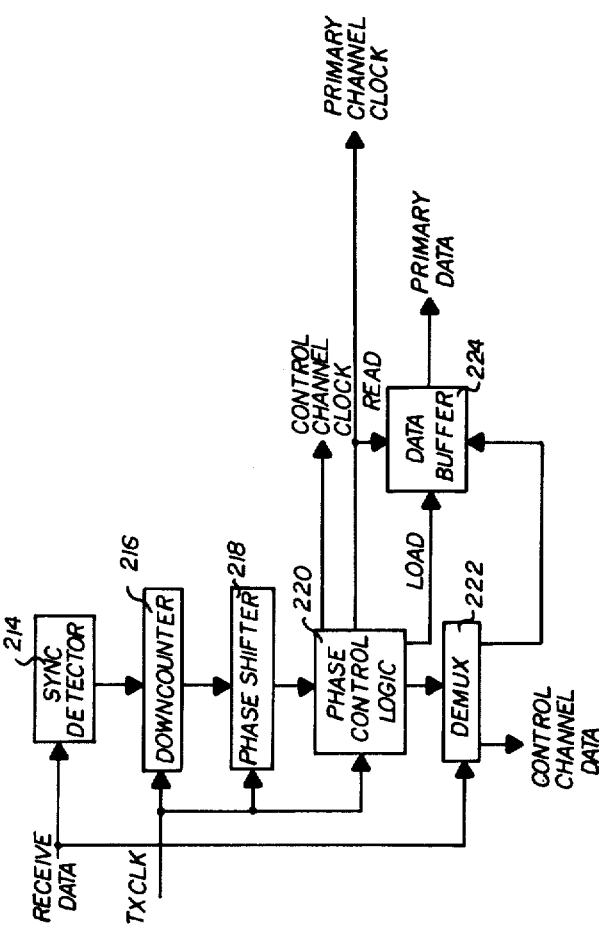
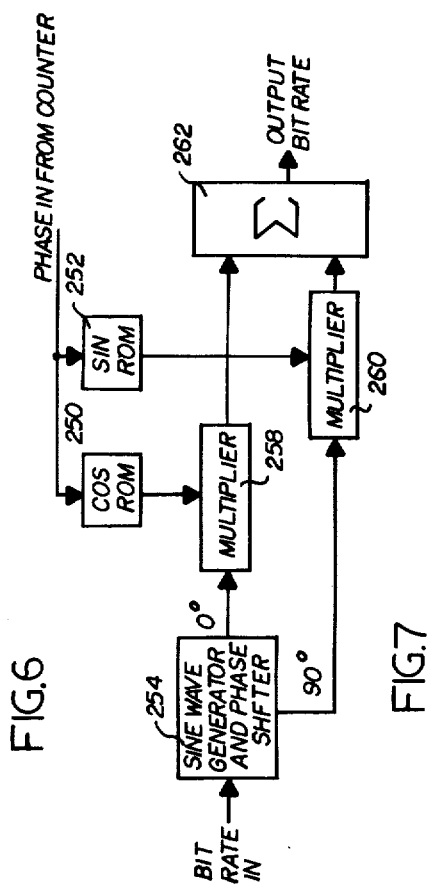
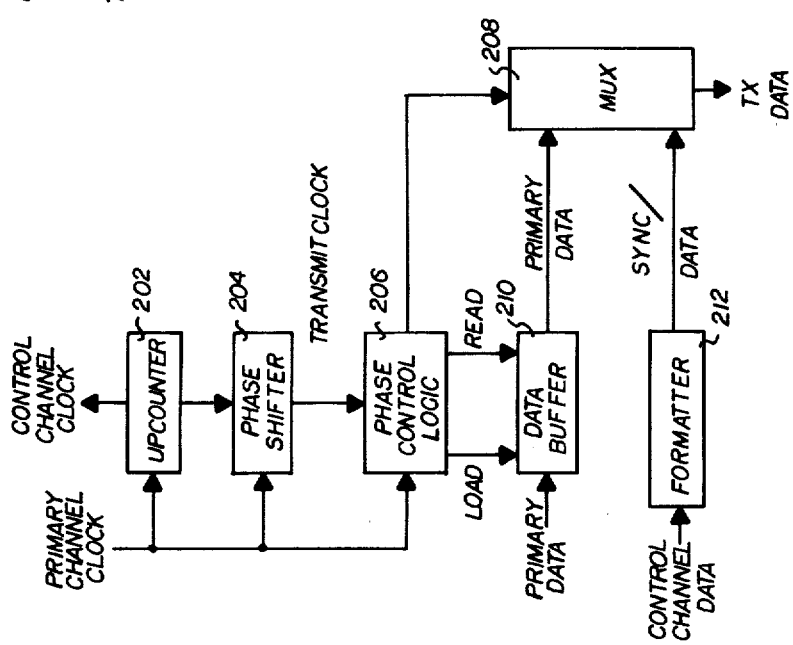
FIG.6
FIG.7
FIG.5 ically to a satellite communications system including means for continuously communicating power control information between the participating stations, without requiring a separate communications channel.

REAL-TIME ADAPTIVE POWER CONTROL IN SATELLITE COMMUNICATIONS SYSTEMS

CROSS REFERENCE TO RELATED APPLICATION

The subject matter hereof is related to that of a commonly-owned, co-pending U.S. application of Hans Scharla-Nielsen, filed Dec. 15, 1977 and assigned Ser. No. 860,990.

BACKGROUND AND FIELD OF THE INVENTION

The present invention relates to communications systems employing a power-limited repeater, and more particularly to a satellite communications system including means for continuously communicating power control information between the participating stations, without requiring a separate communications channel.

Extensive use is currently being made of satellite repeaters in a wide variety of communications applications. The number and size of the Earth-based stations which may simultaneously participate in the use of any given satellite repeater is constrained by the limited availability of power at the satellite. To optimize use of the satellite, then, it is necessary that the power which is available be allocated as efficiently as possible.

Unfortunately, these satellite communications links are subject to changing levels of signal attenuation due, for example, to the occurrence of rainfall between the satellite and a communicating terminal. Efficient power allocation can still be realized, however, by utilizing an adaptive system, wherein the amount of power allocated to each link is continuously regulated in accordance with signal quality measurements made at the various receiving stations. The implementation of such a scheme is simplified to some extent by the fact that the power output of most satellites is a function of the power received thereby. Thus, the power output of the satellite may be adjusted by the simple expediant of varying the power which is transmitted to it.

The adaptive power control must be accomplished on a continuous, real time basis if it is to operate effectively, since there may exist short term attenuation variations which are quite large. It is possible, for example, for the sudden onset of a rainstorm to introduce an attenuation change on the order of 0.1 db per second, or more. In order to implement real time, adaptive power control, however, it is necessary that there by a continuous flow of power control information between the various participating stations. This could represent a significant constraint in many applications because of the cost of the power control equipment, as well as the requirement for at least one additional channel upon which this power control information could be communicated. These can be important factors in determining whether or not power control is economically feasible in a satellite communications system. It would clearly be desirable to provide a system wherein power control information could be communicated continuously, and wherein little additional equipment were required, little or no modifcation to existing equipment were required, and little additional communication channel capacity were necessary.

SUMMARY OF THE INVENTION

The present invention provides a system for continuously communicating power control information in an adaptive power control scheme for controlling the allocation of transmitter power of a repeater joining at least two transmitter/receiver stations and having a limited availability of power. The disclosed system requires little additional communications capacity. Also, little or no modification to existing equipment is required, and the additional circuitry which must be included is quite simple. Furthermore, the disclosed system permits the transmission of power control information over an existing channel, already carrying normal data traffic. As will be made clearer hereinafter, this system can be used regardless of the coding of the normal data communicated over the channel.

In accordance with the present invention, a system is provided for accomplishing adaptive power control in communications systems wherein first and second stations communicate serial streams of binary data bits via a power-limited repeater having a power output which is functionally related to power input. The system includes a quality monitor associated with the second station for providing an indication of the quality of the signal received by the second station from the first station via the repeater. An encoder is included which encodes the signal quality indications onto a first stream of binary data bits which is being transmitted to the first station from the second station. The encoder includes means responsive to the signal quality indication for providing a second serial stream of binary data bits in accordance therewith and having a bit rate equal to 1/Nth that of the first serial stream of binary data bits. The encoder also includes a circuit which responds to the first and second streams of binary data bits to provide an output bit stream having a bit rate $(N+1)/N$ times the bit rate of the first serial stream of binary data bits, wherein $N/(N+1)$ of the bits of the output bit stream correspond to bits of the first serial of binary data bits, and $1/(N+1)$ of the bits of the output bit stream correspond to the bits of the second serial stream of binary data bits. The output bit stream is provided for transmission to the first station in place of the first serial stream of binary data bits. A decoder, associated with the first station, responds to the output bit stream received from the second station, and extracts the signal quality indication therefrom. The decoder includes a circuit for separating the first and second bit streams of binary data from the output bit stream. A circuit at the frist station adjusts the power level of the signal transmitted by the first station to the second station via the repeater, in accordance with the signal quality indication as recovered by the decoder. The net result is that the signal quality indications are communicated between the stations without requiring a separate communications channel.

BRIEF DESCRIPTION OF THE DRAWINGS

These and other objects and advantages of the present invention will become more readily apparent from the following description of a preferred embodiment, as taken in conjunction with the accompanying drawings which are part hereof and wherein:

FIG. 2 is a more detailed block diagram of the circuitry included at one station of the satellite communications system illustrated in FIG. 1;

FIG. 3 is a timing diagram useful in understanding the system of FIG. 2;

FIG. 5 is a block diagram of circuitry in accordance with the present invention, which is operative to encode the power control information into the primary data stream;

FIG. 6 is a block diagram of a decoder in accordance with the present invention, useful in recovering power control information encoded with the circuitry of FIG. 5;

FIG. 7 is a block diagram of a phase shifter which may be used in the encoder/decoder scheme of FIGS. 5 and 6.

DESCRIPTION OF THE PREFERRED EMBODIMENT

Figure 1:
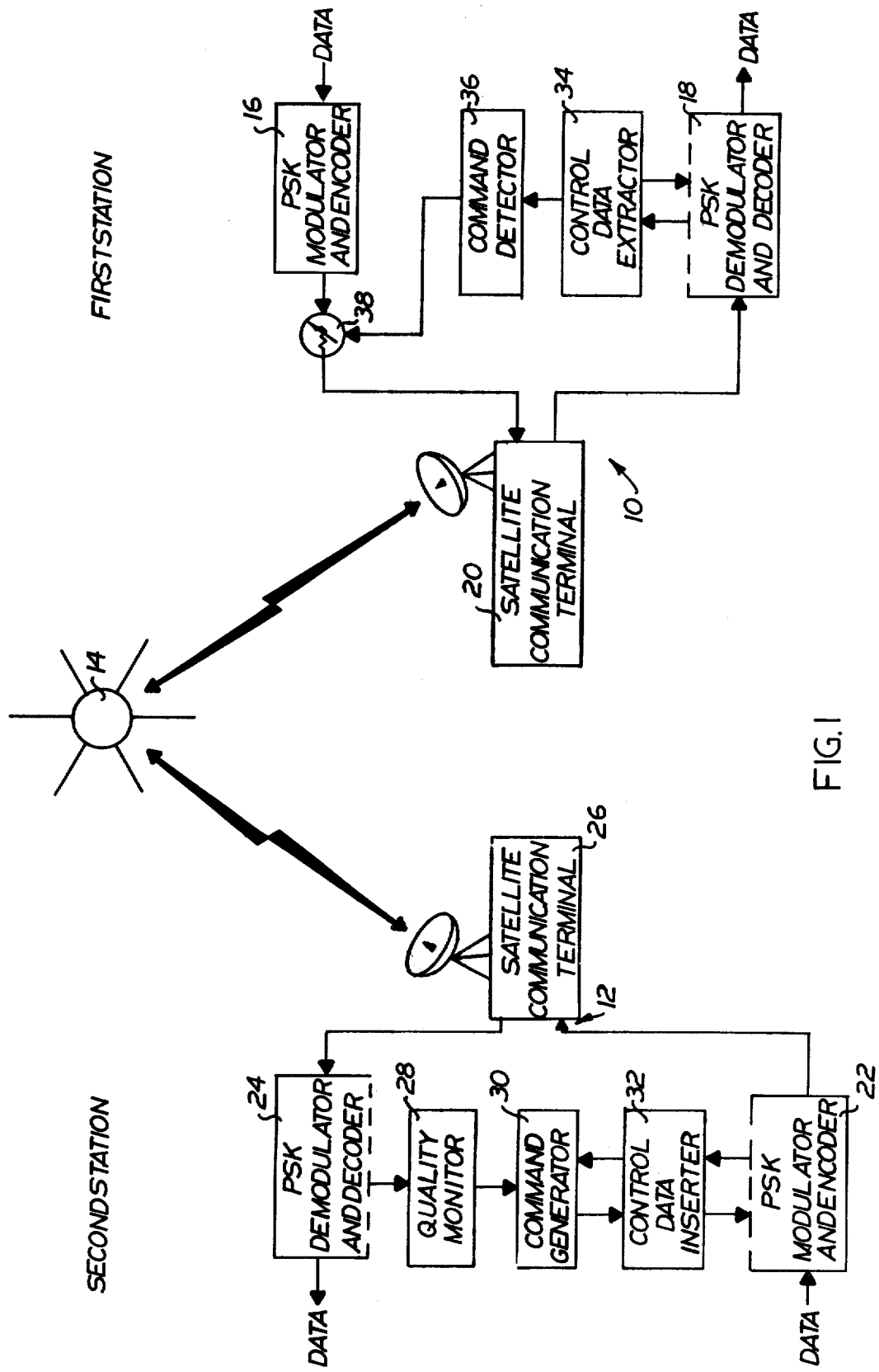
FIG. 1 is a block diagram of a satellite communications system in which the present invention can conveniently find use.

There is illustrated in FIG. 1 a satellite communications system wherein a first terminal 10 communicates with a second terminal 12 via a frequency translating satellite repeater station 14. Satellite 14 receives signals at an input power level from each station, amplifies them, translates them to a different frequency, and then retransmits them to the other station at an output power level. For the purposes of the ensuing discussion, it will be presumed that satellite transponder 14 has a limited availability of power and a monotonic power-in/power-out transfer characteristic. It may, for example, be linear. Because of the monotonic power transfer characteristic, the amount of power utilized by satellite repeater 14 for retransmission of a signal will be dependent upon the magnitude of the signal received thereby. It is therefore possible to control the amount of power utilized by satellite repeater station 14 from a ground station by controlling the gain of the signal transmitted to the satellite.

In FIG. 1, stations 10 and 12 communicate digital data (which will occasionally be referred to hereinafter as "primary" data) in full duplex between one another. Station 12 monitors the received signal to determine, on a real-time basis, the quality thereof. On the basis of this determination, station 12 generates a command signal which is retransmitted to station 10 via satellite repeater 14. Station 10 will extract this control signal and will utilize it in such a manner as to control, in real time, the gain of the signal being transmitted to station 12 via satellite 14. This closed-loop gain control system will regulate the amount of power transmitted by station 10 to station 12 via satellite repeater 14 so as to maintain only a predetermined level of signal quality, without the provision of excess margin.

In FIG. 1, first station 10 includes a PSK modulator and encoder 16, a PSK demodulator and decoder 18, and a satellite communications terminal 20. Similarly, second station 12 includes a PSK modulator and encoder 22, a PSK demodulator and decoder 24, and a satellite communications terminal 26.

Each station will be provided with additional circuitry for providing adaptive satellite power control. Second station 12 will include a quality monitor 28 which will respond to the soft decisions which are generated by PSK demodulator 24 regarding the data content of the PSK signal to provide a signal indicative of the quality of the received signal. A command generator 30 will respond to this quality signal to supply power control data which must be communicated to the first station 10 via the satellite communications link. This power control data will be inserted into the primary data stream by a control data inserter 32. The output of PSK modulator and encoder 22 will therefore comprise a modulated stream of data which includes both the primary data and the control data provided for purposes of controlling the level of power supplied to satellite repeater 14 by satellite communications terminal 20.

At the first station, PSK demodulator and decoder 18 provides an output to a control data extractor 34 which recovers the control data which was inserted in the data stream at the second station 12, and provides this control data to a command detector 36. Command detector 36 responds to the control data to control the level of attenuation provided by a variable attenuator 38. Satellite communications terminal 20 has a monotonic power-in/power-out characteristic, so that the level of the power transmitted by satellite communications terminal 20 is also controlled by this adjustment of the variable attenuator 38. Since the level of the power retransmitted by satellite transponder 14 is similarly dependent upon the level of the signal received from satellite communications terminal 20, the level of power transmitted by satellite transponder 14 will also be controlled by the adjustment of the variable attenuator 38 by command detector 36.

By providing a quality monitor 28 at second station 12 which is responsive to real-time variations in the quality of the signal received by second station 12, the power level may be controlled on a real-time basis to provide very efficient allocation of satellite transponder power over this communications link.

In FIGS. 1, 2, and 3, digital information constitutes the primary data which is to be communicated over the satellite communications link. In order that this data may be communicated between stations in as error-free a manner as possible, the information may first be coded in such a manner that the occurrence of errors may be readily detected at the receiving station and, preferably, corrected. In the more detailed description which follows, it will first be presumed that an error-correcting code is (e.g. convolutional encoding) so that errors, whether intentionally created or otherwise, may be detected and corrected at the receiving station.

In FIG. 2 there is shown a more detailed diagram of the circuitry included at second station 12. It will be seen that PSK demodulator and decoder 24 includes separate PSK demodulator and decoder stage 40 and 42. PSK demodulator 40 reponds to the modulated signal received by the satellite communications terminal 26 to synchronize a clock signal with the timing of the incoming data. This clock signal will be supplied along a clock output line 44, and will be used to synchronize the operation of the decoder 42 and the quality monitor 28.

In accordance with well-known techniques, PSK demodulator 40 will also serve to derive information regarding the data content of the PSK modulating signal which is supplied thereto. This information will be supplied to the decoder 42 in the form of "soft decisions". These soft decisions will be multibit binary signals which, in the embodiment described herein, include a polarity bit supplied along a first output line 48, and magnitude bits supplied along output lines 46. PSK demodulator 40 will generally include some form of automatic gain control so that the mean magnitude of the soft decisions will have a known value. The amount of deviation of these magnitude bits from the mean may be considered as representing the probability that the polarity bit provides a true indication of the data content of the received signal. Thus, the closer the magnitude of the soft decision magnitude bits is to the mean magnitude, the higher the quality (i.e., signal to noise ratio) of the received signal. On the other hand, signals having a lower signal to noise ratio, and hence lower quality, will be characterized by greater deviations from the mean magnitude. The soft decision magnitude bits are thus directed to a quality monitor 28 which utilizes this relationship between signal quality and soft decision deviation from the mean magnitude to derive an output signal indicative of the quality of the received signal.

Quality monitor 28 includes a weighting network 50 which responds to the soft decision magnitude bits to provide a weighted output signal (corresponding to the deviation of the magnitude of each soft decision from the mean) to a digital filter, generally indicated at 52. Weighting network 50 could comprise simply a signal subtractor and an absolute value circuit (not shown). The subtractor would subtract the known mean magnitude from the magnitude of each soft decision to provide an output indicating the deviation of the magnitude of that soft decision from the mean. The output of the subtractor would include both positive and negative deviation indications. Since the sign of the deviation is unimportant to a determination of the quality of the received signal, an absolute value circuit would be provided so that all deviations would have the same sign. If the output of the subtractor were to have a sign/magnitude format, this could be implemented simply by ignoring the sign bit. In addition to the subtractor and absolute value circuits, it may be desirable in some cases to include a circuit for non-linearly weighting the deviation indications. For example, it may be desirable to weight the indications so that greater deviations will be given greater weight. This could be conveniently accomplished by utilizing the indications to address a memory device, such as a read-only-memory (ROM), with the output of the memory device serving as the output of the weighting netwok.

In any event, the output of the weighting network will comprise digital words which will each indicate the deviation of a given soft decision from a known mean magnitude. The greater the magnitude of this output signal, the lower the quality of the received signal. By filtering this output signal over a short interval (this being the function of digital filter 52) a signal quality indication may be provided which will vary substantially in real time with the quality of the received signal.

Digital filter 52 includes a summing circuit 54 and a binary accumulator 56. Summing circuit 54 serves to subtract a feedback signal from the deviation indications so as to provide a difference signal to binary accumulator 62. Accumulator 62 accumulates these difference signals to provide an output signal having a magnitude which eventually stabilizes at a level wherein the feedback signal balances the average magnitude of the deviation indications. The feedback signal is derived by feeding the output of binary accumulator 56 through a multiplier 58. The other input to multiplier 58 is supplied by a program matrix 60. The purpose of program matrix 60 and multiplier 58 is to provide some means for tailoring the operation of the quality monitor to the data rate of the incoming signal. If program matrix 60 and multiplier 58 were not included, the output of binary accumulator 56 would depend not only upon the quality of the received signal, but also upon the data rate of the incoming signal. Program matrix circuit 60 will provide a signal which will adjust the feedback so as to compensate for whatever data rate has been selected.

The output of binary accumulator 56 thus represents a filtered version of the magnitude of the deviation of the soft decisions from a known mean value. Since the time constants involved in digital filter 52 are quite small, this signal varies substantially in real-time with variations in quality of the signal received by second station 12 from first station 10 via satellite transponder 14.

This quality signal is directed to a magnitude comparator 62 which serves to compare the quality of the received signal, as indicated by the output of binary accumulator 56, with an acceptable range defined by thresholds which are provided by threshold selections switches 64. An output signal will be supplied by magnitude comparator 62 which will be dependent upon the relative magnitude of the output of digital filter 52 and the acceptable range. The output of magnitude comparator 62 may take the form of a two bit binary word indicating simply whether the signal quality is within the specified range, or, if not, whether an increase or decrease in signal strength is necessary to bring the signal quality within the desired range. The output of magnitude comparator 62 could also take the more complex form of a binary word which indicates not only whether the signal quality is outside of the desired range, but also the magnitude of any excursion from this range. In either case, this signal quality indication provided by the magnitude comparator 62 will be directed to command generator 30.

Command generator 30 includes a latch 66 for providing intermediate storage of the signal quality indication provided by quality monitor 28. Control word generator 68 responds to the signal quality indication stored in latch 66 to provide a serial stream of command data which will ultimately be transmitted over the satellite link. Control word generator 68 encodes this signal quality information in such a manner that the information can be communicated in a high integrity manner over the error prone satellite link. Control word generator 68 also combines timing information with the encoded signal quality information so that the "framing" of the encoded signal quality information can be reconstructed at the receiving station.

A timing generator 70 is included in command generator 30 for controlling the operation of the command generator. Timing generator 70 depends for its operation upon a control channel clock derived from command inserter 32. Timing generator 70 serves to first strobe a signal quality indication from the quality monitor into latch 66 and then to provide clock signals to the control word generator 68 so that the signal quality indication newly strobed into latch 66 may be communicated over the satellite link. At the conclusion of transmission of the control information corresponding to this signal quality indication, timing generator 70 will strobe a new signal quality indication into latch 66, and so on.

The command data serially generated by control word generator 68 is directed to the command inserter 32. Command inserter 32 combines the primary data supplied by coder 72 with the command data supplied by command generator 30 so as to provide a composite signal. This composite signal will then be modulated onto a carrier wave signal by PSK modulator 74 so as to provide a modulated signal for transmission over the satellite link.

As stated previously, coder 72 is assumed to be a device for encoding the primary data in an error-correcting code so that errors in the stream of data may be detected and corrected at the first station. In the system illustrated in this Figure, command inserter 32 serves to intentionally introduce errors into the stream of encoded primary data in accordance with the command data serially generated by command generator 30. This command data will be supplied at a rate established by the control channel clock. The control channel clock is derived by dividing down the primary data clock by a divide-by-N circuit 76. A clock pulse is supplied by divide-by-N circuit 76 every Nth clock pulse of the primary data clock. Upon the occurrence of this clock pulse, the symbol occurring in the encoded primary data channel will either be inverted or not inverted by exclusive-OR gate 80, in accordance with a signal supplied by sync control 78.

Sync control 78 will always intentionally insert an error every 2N data bits so as to provide an easily identifiable synchronizing pattern to be used in synchronizing the operation of the control data extractor 34 at the first station. Sync control 78 will also control the insertion of an error at the bit position midway between the sync pulses, in accordance with the value of the command data signal supplied by control word generator 68. This may be seen more clearly through reference to the timing diagram of FIG. 3.

The insertion of errors into the encoded primary data stream is accomplished through use of an exclusive -OR gate 80. The primary data is directed to one input of gate 80, with the other input being used for control purposes. The primary data stream will pass through gate 80 without interference when a logical "0" is supplied to the control input. The output will be inverted, however, when a logical "1" is supplied to the control input. Those symbols which have been inverted by gate 80 will represent intentionally introduced errors in the output data stream. When a control input having the form shown in FIG. 3 is used, the output of exclusive -OR gate 80 will comprise a binary stream of digital information corresponding generally to the encoded primary data stream, except that errors have been intentionally inserted therein as specified previously. This modified stream of data is directed to PSK modulator 74 via a buffer circuit 82.

As long as the errors which are inserted in this manner are spaced far enough apart, very little degradation will be introduced into the link as a result thereof. It has been found that the degradation of the link would be on the order of 0.25 db if an error spacing of 200 symbols were used. If we assume a minimum primary data symbol rate of 16 kilobits per second and a synchronizing scheme for the control channel as described herein, this would yield an available control channel rate of 80 bits per second. This is entirely adequate since it now appears the real time power control may be accomplished with a control link throughput on the order of 5 commands per second. If we assume that an 8-bit command is adequate for error protection, however, the required control channel rate would be only 40 bits per second. The described scheme thus has twice the required capacity and can easily operate to supply commands at the rate necessary for real-time power control.

Figure 4:
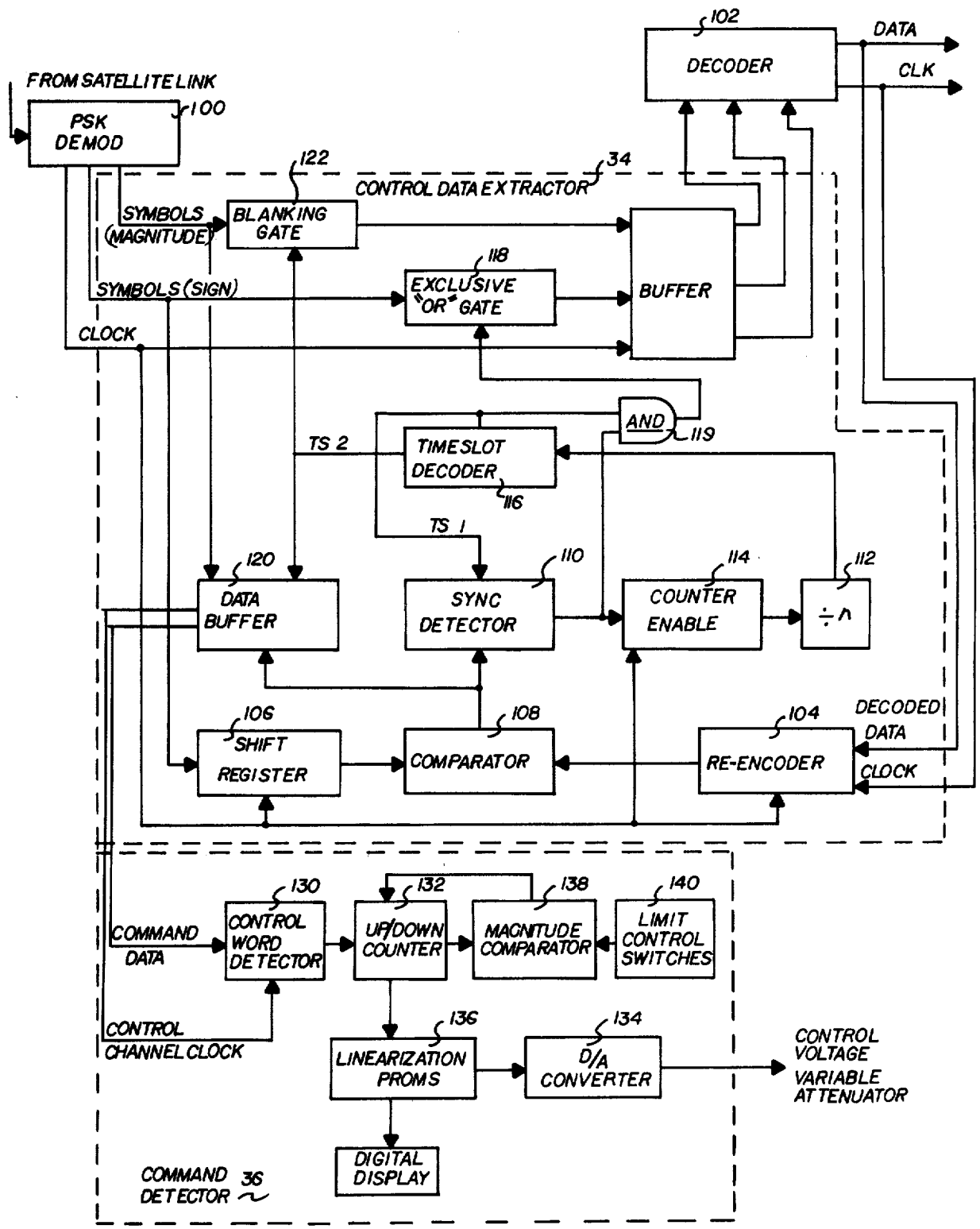
FIG. 4 is a more detailed block digram of the circuitry included at the other station of the communications system of FIG. 1; ;p

Referring now to FIG. 4, there is shown a more detailed block diagram of the circuitry associated with the first station 10 of the satellite communications system illustrated in FIG. 1. As with station 12, the PSK demodulator and decoder 18 of station 10 includes a separate PSK demodulator section 100 and a decoder section 102. Also as with station 12, PSK demodulator 100 responds to the PSK modulated signal received by the corresponding satellite communications terminal and provides soft decisions regarding the data content thereof. These soft decisions are again composed of magnitude and sign portions and are accompanied by a symbol clock. In order that the intentionally inserted errors may be removed therefrom for purposes of extracting the control data from the demodulated signal, the soft decisions are directly routed to the decoder 102 which supplies an error corrected version of the primary data at the output thereof.

The decoded data supplied by decoder 102 is then re-encoded by an encoder 104, associated with the control data extractor 34, which supplies a re-encoded but error-corrected version of the data at the output thereof. Assuming the decoder is operative to correct all errors occurring within the modulated signal (whether intentionally inserted or otherwise), the output of re-encoder 104 will correspond exactly with the output of coder 72 at the second station 12. The control data can then be extracted through the process of merely comparing the re-encoded data with the data modulated by PSK demodulator 100.

Because of the amount of time necessary for decoder 102 and re-encoder 104 to operate on the data, a shift register 106 must be provided for delaying by an equal amount the data supplied directly by PSK demodulator 102. The bit being supplied at the output of shift register 106 should therefore correspond to the re-encoded bit being supplied at the same time by re-encoder 104. Consequently, if no error has been inserted in the data stream, these bits will have identical values. If, however, an error has occurred at this point in the incoming bit stream, then the output of shift register 106 will differ from the output of re-encoder 104. A comparator 108, which may simply be an exclusive -OR gate, is provided for making this determination. Assuming that no errors have been introduced as a result of communication of the signal over the satellite link, the output of comparator 108 will reflect only the intentionally inserted errors, and will thus correspond with the output of sync control 78.

The output of comparator 108 is directed to a sync detector 110 which synchronizes the operation of a divide-by-N counter 112 by means of a counter enable circuit 114. The output of divide-by-N circuit 112 is directed to a time slot decoder 116 which directs the pulses provided by divide-by-N circuit alternately onto two output lines $TS_1$ and $TS_2$. The resulting pulse trains are synchronized in frequency but are 180° out of phase. One output signal, sync signal $TS_1$, is synchronized by sync detector 110 and counter enable 114 with the occurrence of the periodic sync errors which have been inserted in the communication stream. The other output signal, data timing signal $TS_2$, includes pulses occurring midway between the pulses of sync signal $TS_1$; the timing of these pulses therefore corresponds to timing of the data errors which have been inserted in the communication stream (FIG. 3).

The sync output $TS_1$ of time slot decoder 116 is synchronized with the periodic sync errors as follows.

Sync detector 110, in its simplest form, provides a high logic level output whenever the data timing output $TS_1$ is low, or when the comparator output is high. Thus, when the data timing signal $TS_1$ is properly synchronized with the periodic sync errors, the sync detector output will remain continuously high because the data timing signal will be high only when the comparator output is also high.

This high level output provided by sync detector 110 will enable the counter enable circuit 114 (which may simply be an AND gate) to pass the clock signals recovered by PSK demodulator 100 to divide-by-N counter 112.

When synchronization is lost, the output of sync detector 110 will shift to a low level upon the next data timing pulse $TS_1$ since the data timing output $TS_1$ will not coincide with the periodic sync error. The counter enable circuit 114 will therefore disable the supply of clock pulses to counter 112, causing the $TS_1$ output of timeslot decoder 116 to remain high. The system will then wait until the next high output of comparator 108 at which point the output of sync detector 110 will again shift high, and counting will resume.

Sync detector 110 may, of course, also employ a more sophisticated sync detector algorith to increase the integrity of the synchronization process.

Sync output $TS_1$ is also directed to an exclusive -OR gate 118 for the purpose of complementing the symbols which have been deliberately inverted at second station 12 for the purpose of indicating the periodic sync pulse. Because of this, the errors due to the synchronizing signals are effectively removed. The $TS_1$ signal supplied to exclusive "OR" gate 118 is ANDed with the sync detector output by AND gate 119 so that complementing will only take place when the control data extractor is synchronized.

The data timing output $TS_2$ of the time slot decoder 116 is directed to a blanking gate 122 which minimizes the "magnitude" portion of those symbols which occur in time slots in which command data has been inserted in the communications stream. Both the blanking of the command data symbols, and the correction for the sync signals help to simplify the task of decoder 102 in recovering a substantially error free signal.

The data timing output $TS_2$ of time slot decoder 116 is also directed to data buffer 120, and serves as a strobe input thereto so as to cause data buffer 120 to latch the magnitude signal supplied by PSK demodulator 100 and a sign output corresponding to the output of comparator 108. Because of the timing of the strobe signal, the output of data buffer 120 will comprise soft decisions corresponding to the command data. In this manner, the command data is extracted from the communications stream.

The command data thus extracted is directed to a command detector 36 including a control word detector 130. Control word detector 130 serves to reverse the algorithms provided in control word generator 68 so as to recover the signal quality information therefrom. The signal quality information thus recovered controls the level of power transmitted by first station 10 through use of an up/down counter 132. The amount of attenuation provided by voltage variable attenuator 30 is directly related to the count contained within counter 132, and is thus adjustable through adjustment of this count. Control word detector 130 accomplishes this adjustment by providing an appropriate count-up or count-down pulse to up/down counter 132 in accordance with each signal quality indication. The output of up/down counter 132 is directed to a D/A converter 134 via a linearization network 136. The output of D/A convertor 134 comprises an analog control voltage which is directed to voltage variable attenuator 38 for the purpose of controlling the magnitude of the signal supplied to satellite communications terminal 20 from PSK modulator and encoder 16. The linearization network 136 is included to linearize the effect of each increment of counter change with respect to the decibel change in power level caused thereby. Thus, each incremental change of the count contained within up/down counter 132 will produce a fixed increment of change in the power supplied to satellite communications terminal 20.

A magnitude comparator 138 may be provided which compares the count contained within up/down counter 132 with limits externally established by means of limit control switches 140. Magnitude comparator 138 provides counter disable signals which prevent the count from passing beyond these limits, thereby confining the count to within predetermined extremes corresponding to the extremes of power level adjustment which is available through voltage variable attenuator 38.

The system illustrated in FIGS. 1-4 thus operates to provide real-time adaptive control of the power supplied by a satellite transponder. In the system illustrated in these figures, the power control information was communicated between the stations by intentionally inserting errors in an error-correcting coded signal. Some systems may not employ the use of error-correcting codes and for these systems another approach must be devised.

Therefore, in accordance with the present invention, the approach illustrated in FIGS. 5 and 6 may be used to continuously communicate power control information, regardless of the type of coding utilized in the primary data stream.

FIG. 5 illustrates a configuration of the command data inserter 32 of FIG. 1 in accordance with the present invention. This command data inserter operates to create gaps in the primary data stream and to insert (multiplex) the control channel data and synchronizing information into these gaps. Since this approach does not require the recognition and correction of errors in the data stream at the first station 10, it is not necessary that the primary data be encoded in an error-correcting code.

Referring now to FIG. 5, the control data inserter illustrated therein includes circuitry 200 for deriving the control channel clock and the timing of the composite output channel provided by the multiplexer 208. This timing signal, hereinafter referred to as the transmit clock, must have a frequency which is equal to the sum of the rates of the primary channel clock and the control channel clock.

An UP counter 202 is provided for deriving the control channel clock from the primary channel clock. UP counter 202 counts the pulses provided along the primary channel clock line and provides a pulse along the control channel clock line each time it overflows. UP counter 202 thus serves as a divide-by-N counter, where N is the maximum count reachable by the UP counter 202. The multibit count contained within UP counter 202 is directed to a phase shifter 204 along with the primary channel clock. This multibit count advances continuously from a low value immediately following a control channel clock pulse to a high value immediately preceding the next control channel clock pulse. The count can thus be interpreted as representing the "phase" of the control channel clock.

Phase shifter 204 responds to this multibit count and to the primary channel clock to provide a transmit clock at the output thereof having a repetition rate which is equal to the sum of the primary channel clock rate and the control channel clock rate. The operation of phase shifter 204 will be described in greater detail hereinafter. The transmit clock generated by phase shifter 204 will smoothly advance in phase with respect to the primary channel clock, and will gain a full period on the primary channel clock within the time between successive control channel clock pulses.

Phase control logic circuit 206 is synchronized with the transmit clock and derives therefrom the timing for the multiplexing operation by which the primary data and control channel data are combined to form the composite output. Phase control logic 206 provides multiplexer control signals to multiplexer 28 which cause multiplexer 208 to connect one of two input sources to the output line. These two sources include the primary data source (supplied by a data buffer 210) and control channel data and sync source (supplied by a control channel formater 212). The order in which these input sources are connected to the output line is such that one bit of primary data is outputted from multiplexer 208 for each one of the N transmit clock pulses occurring between control channel clock pulses, with one bit of control channel data/sync being outputted for each transmit clock pulse corresponding to a control channel clock pulse (i.e. every N+1 transmit clock pulses).

Data buffer 210 is required because the primary data must be outputted at a more rapid rate than the rate at which it is supplied by the coder 72 (FIG. 2). Data buffer 210 is provided with load and read signals by phase control logic 206. The load signal corresponds to the primary channel clock and causes the buffer to accept data at this rate. The read signal corresponds to the transmit clock and causes the buffer to provide primary data output bits at this more rapid rate. Formatter 212 is provided for arranging the control channel data and sync data in a selected appropriate format, so that the control channel data may be readily recognized and extracted at the control data extractor. In the illustrated embodiment, this format is such that control channel data bits alternate with synchronizing bits. These periodic synchronizing bits may be either all "1's" or all "0's".

The complimentary control data extractor 34 of the first station 10 is illustrated in FIG. 6. This control data extractor demultiplexes the information received by satellite communications terminal 20 to provide primary data and control data along separate output lines. The received data is first directed to a sync detector 214 which identifies the periodic sync which was inserted by formatter 212 at the transmitter and sets the phase of a DOWN counter 216. DOWN counter 216 counts down from the phase set by sync detector 214 in accordance with a recovered transmit clock. The output of DOWN counter 216, comprising a multibit count, is directed to a phase shifter 218 for the purpose of recovering a primary channel clock therefrom.

Phase shifter 218 is similar to phase shifter 204 at the control data inserter 32 of second station 12. This phase shifter responds to the multibit count and to the transmit clock to provide an output clock corresponding to the difference between the transmit clock and the control channel clock. Phase shifter 218 thus provides an output signal whose phase is smoothly retarded with respect to the transmit clock and which corresponds in frequency to the primary channel clock. This clock signal, together with the transmit clock, is connected to a phase control logic circuit 220 which provides timing control signals to a demultiplexer 222 and a data buffer 224. Demultiplexer 222 receives the incoming data and directs it to either data buffer 224 or to a control channel output line in accordance with control signals supplied by the phase control logic. The periodic sync bits in the control channel may be removed either by appropriate control of multiplexer 222, or by later processing of the output of demultiplexer 222. Data buffer 224 is loaded at a rate corresponding to the transmit clock and is read out at a rate corresponding to the primary channel clock. The primary data provided at the output of data buffer 224 therefore corresponds to a primary data which was inserted in data buffer 210 at the control data inserter 32.

This approach may, of course, be generalized to allow the insertion of any arbitrary number of bits (X) to each N bits of primary data. The output bit rate would thus be (N+X)/N times the bit rate of the primary data, with N/(N+X) of those bits corresponding to the primary data, and X/(N+X) of the bits corresponding to the control channel data. The multiplied sequence of bits would then be: N bits of primary data, X bits of control channel data, N bits of primary data, X bits of control channel data, etc.

Referring now to FIG. 7, a phase shifter which may conveniently be used with the multiplexing control data inserter/extractor system of FIGS. 5 and 6 is illustrated. This phase shifter is an implementation of the trigonometric expansion of the sine of the sum of two signals:

$$Sin(A+B) = SinA CosB + CosA SinB$$

The implementation of this function is provided by directing the multibit count contained within the UP counter 202 or the DOWN counter 216 into sine and cosine read only memories 250 and 252. The outputs of memories 250 and 252 comprise multibit digital words which represent the phase of the control channel in terms of sine and cosine functions.

A sine wave generator and phase shifter 254 is provided which responds to an input clock signal to provide output digital words corresponding to the phase of the input clock signal in terms of sine and cosine signals similar in form to those signals provided by cosine and sine read only memories 250 and 252. This circuit will include two phase-locked sine wave generators for generating analog sine wave signals in phase synchronism, and phase opposition, with the incoming signal, and will also include two analog-to-digital convertors for converting these analog signals into sequences of digital words. The outputs of sine wave generator and phase shifter 254 are directed to multipliers 256 and 258 which multiply these phase signals together with the phase signals provided by read only memories 250 and 252. The outputs of multipliers 258 and 260 are summed in a summing circuit 262 to provide an output signal whose frequency corresponds to the sum of the frequencies of the control channel clock and the clock which is provided to sine wave generator and phase shifter 254. An output clock signal is derived from this signal by providing a pulse at each positive zero crossing thereof. If the digital signals resulting from the summation process have a sign/magnitude format, the output clock may be derived simply by ignoring the magnitude portion of the digital sum signal. The output clock rate is then provided along the output line of summing circuit 262.

The satellite communication system which has thus far been described has included only a first terminal 10 and a second terminal 12. The discussion has been limited to two communication terminals only in order to simplify the description. A generalization of the described scheme to N satellite communications terminals will, however, be readily apparent to those skilled in the art.

The described scheme has also involved power control in only a single direction. That is, only the power supplied to the satellite transponder from first station 10 has been controlled in accordance with the real time changes in signal quality in second station 12. When satellite communication terminals 20 and 26 are employed which have similar G/T (sensitivity and power output) characteristics, power control would preferably be provided in both directions. In this case the circuitry which is illustrated would be duplicated in such a manner that first station 10 included a quality monitor, command detector, and control data inserter as shown and described with respect to second station 12, while second station 12 will include a command data extractor, command detector, and variable attenuator as described with respect to first station 10. In this manner, bi-directional power control will be provided.

When, however, a satellite communications net is asymmetrical, that is to say, when satellite communications terminal 20 has a higher G/T than satellite communications terminal 26, the major proportion of satellite transponder power will be utilized in communicating with signals generated by satellite communications terminal 20. In view of this, the complexity and expense of adding power control to this scheme could be simplified by providing satellite communications terminal 26 with a fixed output power and a high enough margin to account for rapid onset attenuation characteristics in the terminal 26 to terminal 20 communications link, while providing only first station 10 with power control. In this manner, the majority of the power utilized by satellite transponder 14 may be efficiently adjusted while still providing a relatively simple and inexpensive system. Although the lower G/T station 12 must in this event be provided with an excess of transmitting power, this margin represents only a small portion of the total satellite transponder power utilized in the link.

Figure 8:
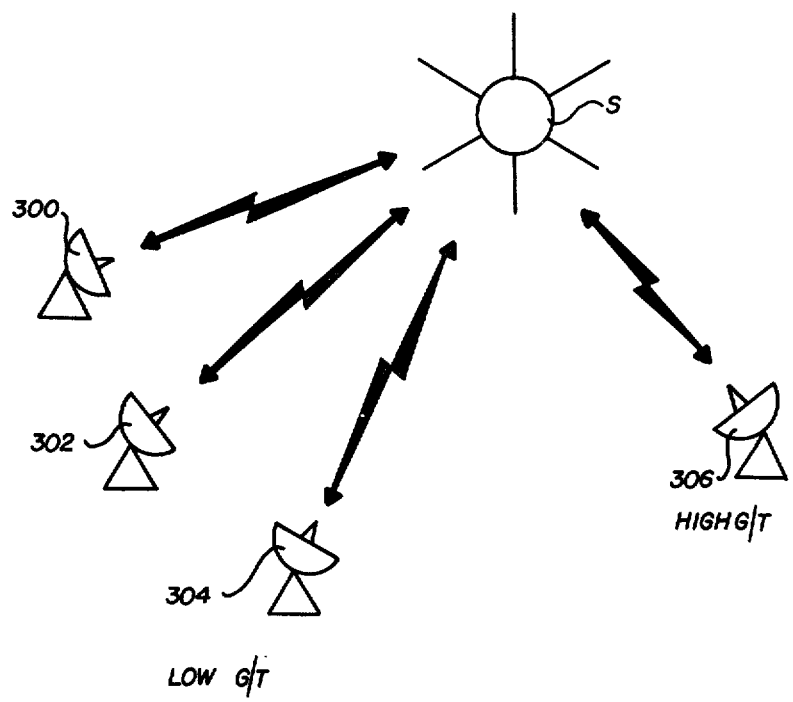
FIG. 8 is a system diagram of a satellite communications system having N member stations wherein power control is accomplished at a single higher G/T station.

As will be seen in FIG. 8, this scheme can be generalized to N lower G/T stations (indicated in the drawing by stations 300, 302, and 304) communicating in full duplex with a single high G/T station 306 via a frequency-division-multiple-access (FDMA) satellite communications link. The power output of stations 300, 302, and 304 will be fixed so as to conserve system complexity, while the power output of station 306 will be modified in accordance with signal quality measurements made at each of stations 300, 302, and 304 so as to modify the power level of the signal supplied to each of the stations. In this manner, a very efficient allocation of the majority of satellite transponder power can be accomplished with a minimum of added system complexity. This approach could, of course, also be utilized in code-division-multiple-access (CDMA) and time division-multiple-access (TDMA) systems.

Although the invention has been described with respect to a preferred embodiment, it will be appreciated that various rearrangements and alterations of parts may be made without departing from the spirit and scope of the invention, as defined in the appended claims.

What is claimed is:

1. Apparatus for providing adaptive power control in communications systems wherein first and second stations communicate serial streams of binary data bits via a power-limited repeater having a power output which is functionally related to power input, comprising:

quality monitor means associated with said second station for providing an indication of the quality of the signal received by said second station from said first station via said power-limited repeater;

encoding means for encoding said signal quality indication onto a first serial stream of binary data bits transmitted to said first station from said second station, and including means responsive to said signal quality indication for providing a second serial stream of binary data bits in accordance therewith and having a bit rate equal to X/Nth that of said first serial stream of binary data bits, where X and N are integers and means responsive to said first and second serial streams of binary data bits for providing an output bit stream having a bit rate $(N+X)/N$ times the bit rate of said first serial stream of binary data bits, wherein $N/(N+X)$ of the bits of said output bit stream correspond to the bits of said first serial stream of binary data bits, and $X/(N+X)$ of the bits of said output bit stream correspond to the bits of said second serial stream of binary data bits, said output bit stream being provided for transmission to said first station in place of said first serial stream of binary data bits;

decoding means associated with said first station, responsive to said output bit stream received from said second station, for extracting said signal quality indication therefrom and including means responsive to said output bit stream for separating said first and second serial streams of binary data therefrom; and means at said first station for adjusting the power level of said signal transmitted by said first station to said second station via said repeater, in accordance with said signal quality indication as recovered by said decoding means, whereby said signal quality indications are communicated between said stations without requiring a separate communications channel.

2. Apparatus as set forth in claim 1, wherein said means responsive to said first and second serial streams of binary data bits responsive to said first serial stream of binary data bits for providing a modified first serial stream having a bit rate $(N+X)/N$ times the bit rate of said first serial stream, with X bits locations of each $(N+X)$ bits of said modified first serial stream lacking information content, and with the remaining N bits of each $(N+X)$ bits of said modified first serial stream representing a corresponding N bits of said first serial stream; and, means responsive to said modified first serial stream and to said second serial stream for multiplexing the bits of said second serial stream into said bits locations lacking information contents of said modified first serial stream, so as to thereby form a composite bit stream serving as said output bit stream.

3. Apparatus as set forth in claim 1, wherein said means responsive to said output bit stream comprises demultiplexer means for selectively directing the bits of said output bit stream onto first or second outputs, means for controlling said demultiplexer means so as to direct bits corresponding to said modified first serial stream onto said first output and to direct bits corresponding to said second serial stream onto said second output, and, means responsive to said first output for reconstructing said first serial stream therefrom.

4. Apparatus as set forth in claim 1, wherein said second station includes means for deriving soft decisions regarding the data content of the received signal, and further wherein said quality monitor means comprises means responsive to said soft decisions for providing said real-time indication of the quality of said received signal.

5. Apparatus as set forth in claim 4, wherein said means responsive to said soft decisions comprises means for determining the amount of derivation of the magnitude of each of said soft decisions from a known mean value and for providing deviation indications in accordance therewith, and means for filtering said deviation indications so as to provide an output signal indicative of the short term average of said deviation indications, said output signal serving as said real time indication of the quality of said received signal.

* * * * *